United States Patent
Hu et al.

(10) Patent No.: US 12,182,649 B2
(45) Date of Patent: Dec. 31, 2024

(54) INFORMATION HANDLING SYSTEM SIM SOCKET PIN PROTECTION SYSTEM AND METHOD

(71) Applicant: Dell Products L.P., Round Rock, TX (US)

(72) Inventors: Chia-Ting Hu, New Taipei (TW); Chun-Po Chen, Taipei (TW); Bo-Wei Chu, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/174,087

(22) Filed: Feb. 24, 2023

(65) Prior Publication Data

US 2024/0289565 A1   Aug. 29, 2024

(51) Int. Cl.
*G06K 7/00* (2006.01)
(52) U.S. Cl.
CPC .................... *G06K 7/0056* (2013.01)
(58) Field of Classification Search
CPC .... G06K 7/0056; G06K 7/0069; G06K 13/06; F21V 21/35
USPC .................. 235/441, 439, 435, 483
See application file for complete search history.

(56) References Cited

U.S. PATENT DOCUMENTS

| | | | |
|---|---|---|---|
| 9,165,237 B2 | 10/2015 | Scarlatella et al. | |
| 2003/0119365 A1* | 6/2003 | Watanabe | G06K 13/0887 |
| | | | 439/630 |
| 2004/0050938 A1* | 3/2004 | Yamaguchi | G06K 13/08 |
| | | | 235/483 |
| 2010/0072284 A1 | 3/2010 | Nishizawa et al. | |
| 2010/0267419 A1 | 10/2010 | Nishizawa et al. | |
| 2013/0072068 A1* | 3/2013 | Holmes | G06K 19/07739 |
| | | | 439/638 |
| 2021/0390272 A1 | 12/2021 | Yang | |

FOREIGN PATENT DOCUMENTS

EP        2902869 B1 *  6/2019  ........... G06F 1/1656

* cited by examiner

*Primary Examiner* — Edwyn Labaze
(74) *Attorney, Agent, or Firm* — Zagorin Cave LLP; Robert W. Holland (57) ABSTRACT

An information handling system has a SIM card slot that accepts a micro SIM card and also accepts a nano SIM card when inserted in an adapter having an outer perimeter of a micro SIM card. The adapter holds contact pads of the nano SIM card in alignment with spring contacts of SIM card socket. When the adapter is inserted into the SIM card socket without a nano SIM card, a contact cover coupled to an eject member has an opening through which spring contacts extend against contact pads, and when the eject member is pressed inward to eject the SIM card adapter, the contact cover moves inward to press down on the spring contacts so that the SIM card adapter is kept clear of the spring contact through ejection.

17 Claims, 6 Drawing Sheets

INFORMATION HANDLING SYSTEM SIM SOCKET PIN PROTECTION SYSTEM AND METHOD

BACKGROUND OF THE INVENTION

Field of the Invention

The present invention relates in general to the field of information handling system card sockets, and more particularly to an information handling system SIM socket pin protection system and method.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Portable telephone information handling systems typically have a tablet configuration. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. In some instances, portable phone information handling systems will use a convertible configuration with a keyboard or with a display on each housing portion having a touchscreen to accept end user inputs.

One common role of portable information handling systems is to provide a communication platform for audio and video communications. Information handling systems typically integrate a wireless network interface controller (WNIC) that supports wireless personal area networks (WPAN) like BLUETOOTH, wireless local area networks (WLAN) like WiFi, and wireless wide area networks (WWAN) like proprietary mobile telephone networks. WPAN and WLAN communicate through public band wireless signals, such as 2.4 GHz and 5 GHz bands, that are accessible for the public to use without a license. WWAN communicate through licensed wireless signal bands that are typically controlled by mobile telephone providers. Generally, information handling systems include a SIM (Subscriber Identification Module) card with an identifier that allows the system to access the proprietary network. Often portable information handling systems include a slot that accepts the SIM card so that an end user can insert a SIM card for the end user's desired proprietary network.

SIM cards are typically available in a micro and a nano configuration. Older micro SIM cards have a larger footprint than newer nano SIM cards and have additional pin contacts. Information handling systems that have a micro SIM card slot can also sometimes accept nano SIM cards that are assembled in an adapter that aligns the slot pins with the card contact pads. The adapter has an outer perimeter that fits into the micro SIM slot and an inner perimeter that accepts the nano SIM card and aligns the nano SIM card contact pads with the spring contacts of the micro SIM slot. One difficulty with the use of the adapter is that insert of the adapter into a micro SIM slot without including a nano SIM card can result in damage to the spring contacts of the slot. End users are tempted to insert the adapter in the slot even when warned not to do so in an attempt to prevent loss of the adapter.

SUMMARY OF THE INVENTION

Therefore, a need has arisen for a system and method which accepts a nano SIM card adapter in a micro SIM card slot without including a nano SIM card in the adapter.

In accordance with the present invention, a system and method are provided which substantially reduce the disadvantages and problems associated with previous methods and systems for adapting a nano SIM card to couple within a micro SIM slot. A contact cover couples to an eject member to move inward in a planar card socket when the eject member activates an eject arm that pushes the planar card and adapter out of the planar card socket. The contact cover has an opening through which spring contacts of the planar card socket contact the planar card when inserted. The contact cover moves inward when the eject member moves the planar card outward so that the contact cover pushes against the spring contacts to prevent engagement against the planar card and/or an adapter of the planar card during ejection of the planar card from the planar card socket.

More specifically, an information handling system processes information with a processor that executes instructions and a memory that stores the information and instructions. A wireless network interface controller (WNIC) interfaced with the processor supports wireless signal communication through a wireless wide area network having a subscriber identifier protocol that uses a subscriber identification module (SIM), such as a mobile telephone network. A slot in a housing of the information handling system accepts insertion of a SIM card into a planar card socket having spring contacts that bias against contact pads of a SIM card. The planar card slot has an internal housing and tray sized to fit a planar card having a micro SIM card footprint. An adapter with an outer perimeter of the micro SIM card fits into the planar card slot and defines an inner perimeter that accepts a nano SIM card so that contact pads of the nano SIM card align with spring contacts. When the adapter is installed in the planar card slot, a contact cover having an opening allows the spring contacts to bias up against the nano SIM card contacts. When an eject member is pressed to actuate an eject arm that pushes the adapter out of the planar card socket, the eject member couples to the contact cover to slide the contact cover inwards and against the spring contacts so as to bias the spring contacts away from contact with the adapter to prevent damage to the spring contacts.

The present invention provides a number of important technical advantages. One example of an important technical advantage is that a planar card socket having spring contacts integrates protection of the spring contacts from damage when an eject member pushes out a planar card or adapter from within the planar card socket. Actuation of the ejection arm synchronously slides a contact cover inward toward the spring contacts of the planar card socket to work against the upward bias of the spring contacts and move the spring contacts away from the planar card tray to protect against damage by impact of the planar card or adapter. Although the example embodiment addresses a planar card socket that accepts micro SIM and nano SIM cards, in alternative embodiments, other types of planar cards may be supported, such as Secure Digital (SD) cards that come in SD, SDHC, SDXC and SDUC types, and can use adapters to support insertion of different sized cards into different sized slots similar to SIM cards.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A contact cover in an information handling system SIM card socket slides during ejection of a SIM card and/or adapter to compress spring contacts of the SIM card socket during ejection and protect the spring contacts from damage by an ejecting SIM card and/or adapter. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
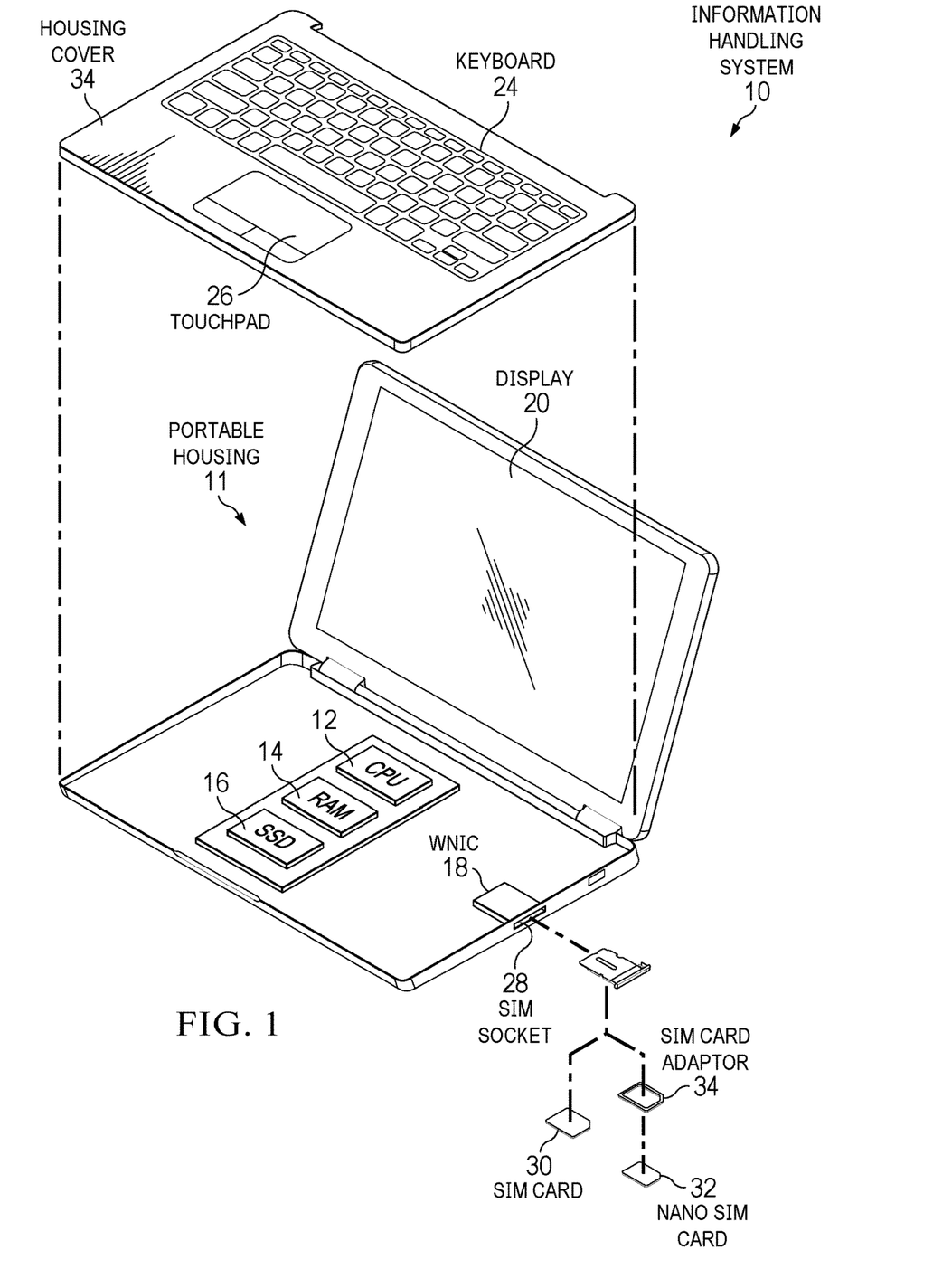
FIG. 1 depicts a portable information handling system having a SIM card socket that accepts a micro SIM card and also a nano SIM card fit into an adapter.

Referring now to FIG. 1, a portable information handling system 10 is depicted having a SIM card socket 28 that accepts a micro SIM card 30 and also a nano SIM card 32 fit into an adapter 34. Portable information handling system 10 processes information with a central processing unit (CPU) 12 coupled in a portable housing 11. A random access memory (RAM) 14 interfaces with CPU 12 to store the instructions and information in support of processing. A solid state drive (SSD) 16 includes non-transitory storage, such as flash memory, that persistently stores information and applications, such as an operating system and applications that execute over the operating system. A wireless network interface controller (WNIC) 18 supports wireless communications with external devices and networks. In the example embodiment, WNIC 18 communicates through wireless wide area networks by reference to identification information stored in a Subscriber Identification Module (SIM) card, as described in greater detail below. A housing cover 34 couples over the processing components and includes a keyboard 24 and touchpad 26 to accept end user inputs. A display 20 integrated in housing 11 presents information as visual images. In various embodiments, various arrangements of processing components may be used.

In the example embodiment, SIM socket 28 is a planar card socket that accepts a planar card having a SIM integrated circuit when inserting through a slot formed in the housing 11. A micro SIM card 30 is a planar card having a footprint that fits into the planar card socket and includes subscriber identification information to access the WWAN. A nano SIM card 32 is a planar card having a smaller footprint than the micro SIM card and also having subscriber identification information to support communication through the WWAN. SIM card adapter 34 has an outer perimeter that matches that of the micro SIM card and an inner perimeter that accepts the nano SIM card. When the nano SIM card fits in the adapter, it fits into the SIM socket in the same manner as the micro SIM card. When the adapter is fit into the SIM socket without the nano SIM card, a central opening of the adapter can potentially catch on spring contacts of the socket and cause damage to the socket. To prevent this risk, a contact cover is included in the socket that covers the socket spring contacts to preclude damage, as is described below in greater detail.

Figure 2:
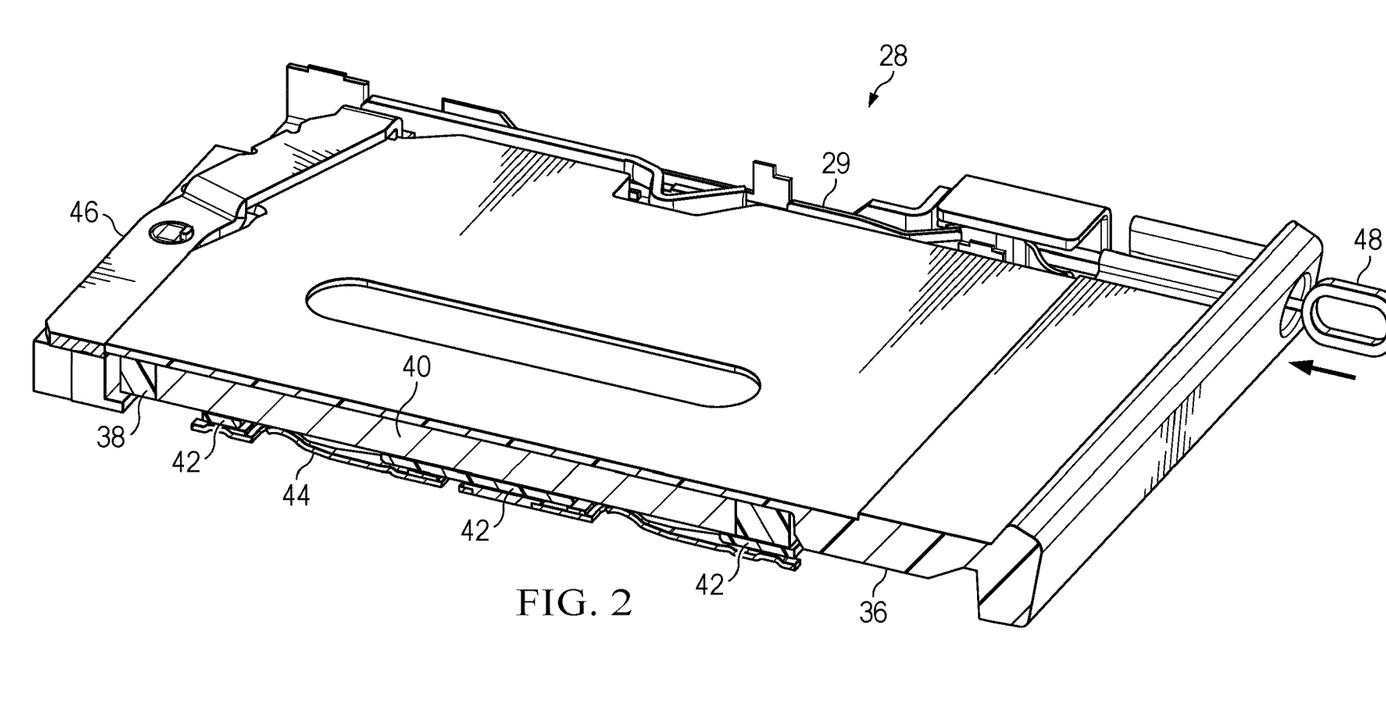
FIG. 2 depicts an upper perspective view of a planar card socket containing a nano SIM card held in an adapter.

Referring now to FIG. 2, an upper perspective view depicts a planar card socket 28 containing a nano SIM card 40 held in an adapter 38. Spring contacts 44 bias up and against nano SIM card 40 to press against contact pads to provide signal communication. Planar card socket 28 has a housing 29 that supports an ejection member 48 at one side engaged with an ejection arm 46. When eject member 48 is pressed inward, it activates eject arm 46 to press against the rear side of housing 29 and rotate about a hinge pin to press a tray 36 out of the socket. SIM tray holds the planar SIM card in a position that aligns contact pins of the SIM card against spring contacts 44. In the example embodiment, an adapter 38 fits around the perimeter of a nano SIM card 40 so that the nano SIM card fits into tray 36 with the footprint of a micro SIM card. A contact cover 42 is disposed between nano SIM card 40 and spring contacts 44 with the spring contacts pressing against the contact pads of the nano SIM card through front and rear openings formed in the contact cover. Contact cover 42 couples with eject member 48 to slide with eject member 48. When eject member 48 is pressed inward to eject tray 36, contact cover 42 is slid forward so that the solid planar surface around the first and second openings engages against and presses down on spring contacts 44. By pressing spring contacts 44 down and away from adapter 38, the spring contacts do not engage against adapter 38 as the SIM card and adapter are slid out of the socket. When adapter 38 is inserted in the socket without a nano SIM card installed, contact cover 42 prevents engagement of the spring contacts with the vertical inner perimeter of the adapter.

Figure 3A:
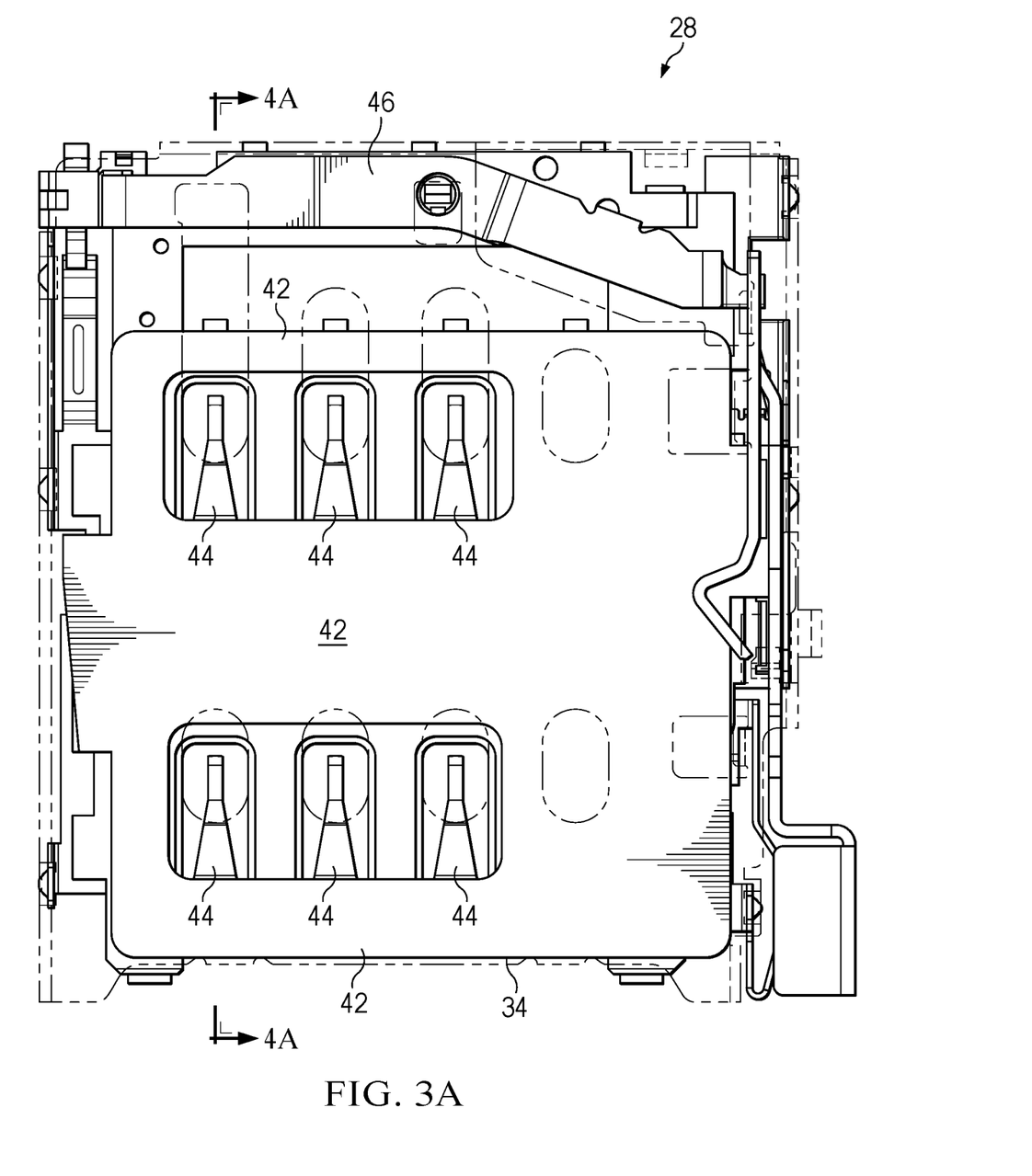
FIGS. 3A and 3B depict an upper view of the planar card socket with a contact cover in a first position having first and second openings aligned with spring contacts and a second position having the contact cover pressing down on the spring contacts to prevent damage as a planar card is removed from the planar card socket.
Figure 3B:
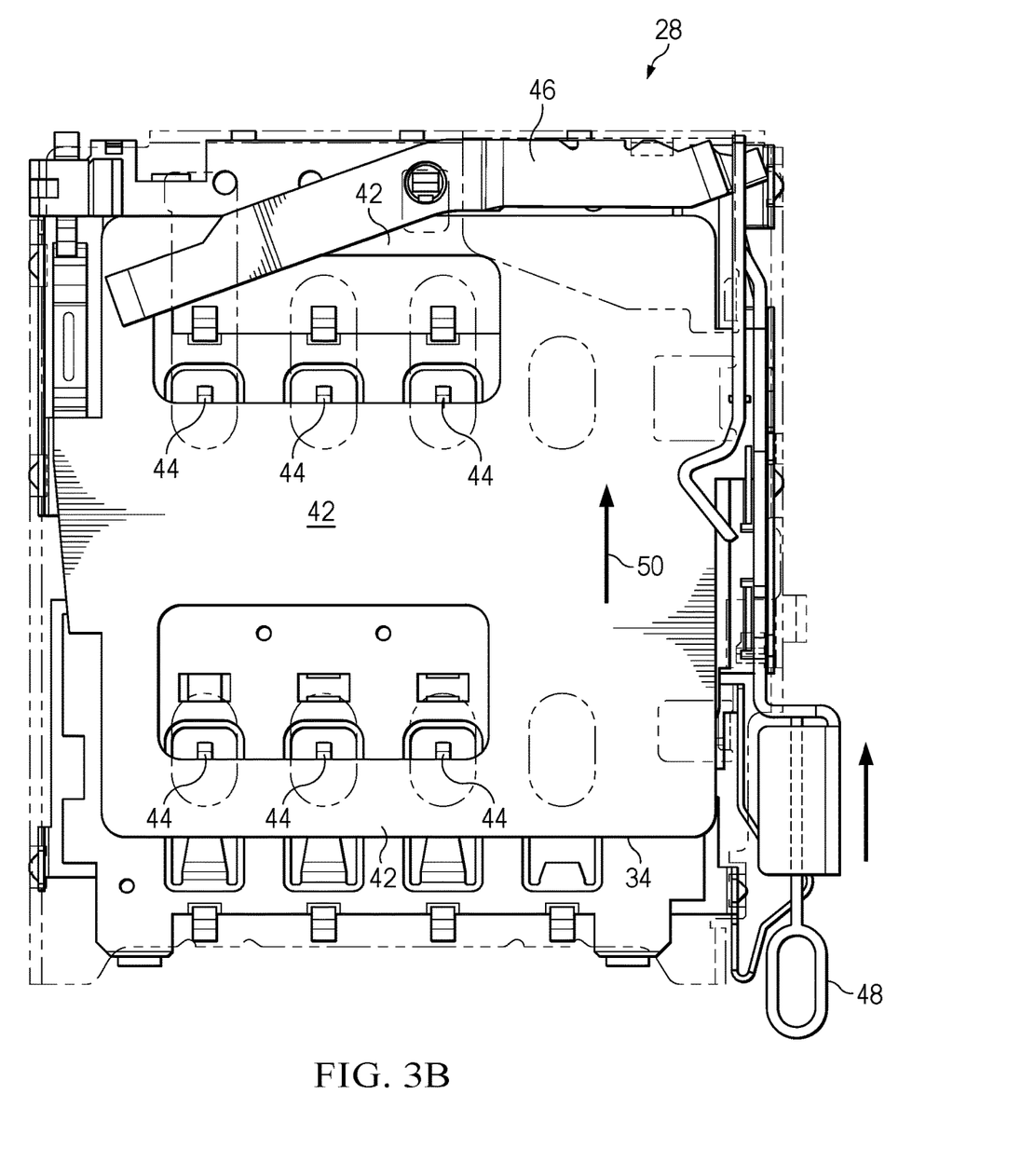

Referring now to FIGS. 3A and 3B, depict an upper view depicts the planar card socket 28 with a contact cover 42 in a first position having first and second openings aligned with spring contacts 44 and a second position having the contact cover 42 pressing down on the spring contacts 44 to prevent damage as a planar card is removed from the planar card socket. FIG. 3A depicts planar card socket 28 in the installed position the eject member fully extended outward so that the left side of eject arm 46 is fully to the rear side of the socket. Two rows of spring contacts 44 extend up through two openings of contact cover 42. FIG. 3B depicts eject member 48 pressed inward to actuate ejection of a planar card from the planar card socket. The inward press of eject member 48 against eject arm 46 causes the left side of eject arm 46 to swing around a hinge pivot and push outward on a planar card in the socket. The inward press of eject member 48 also slides contact cover 42 rearward as shown by arrow 50 so that that planar surface of contact cover 42 slides over spring contacts 44 to press spring contacts 44 downward and away from the ejecting planar card and/or adapter.

Figure 4:
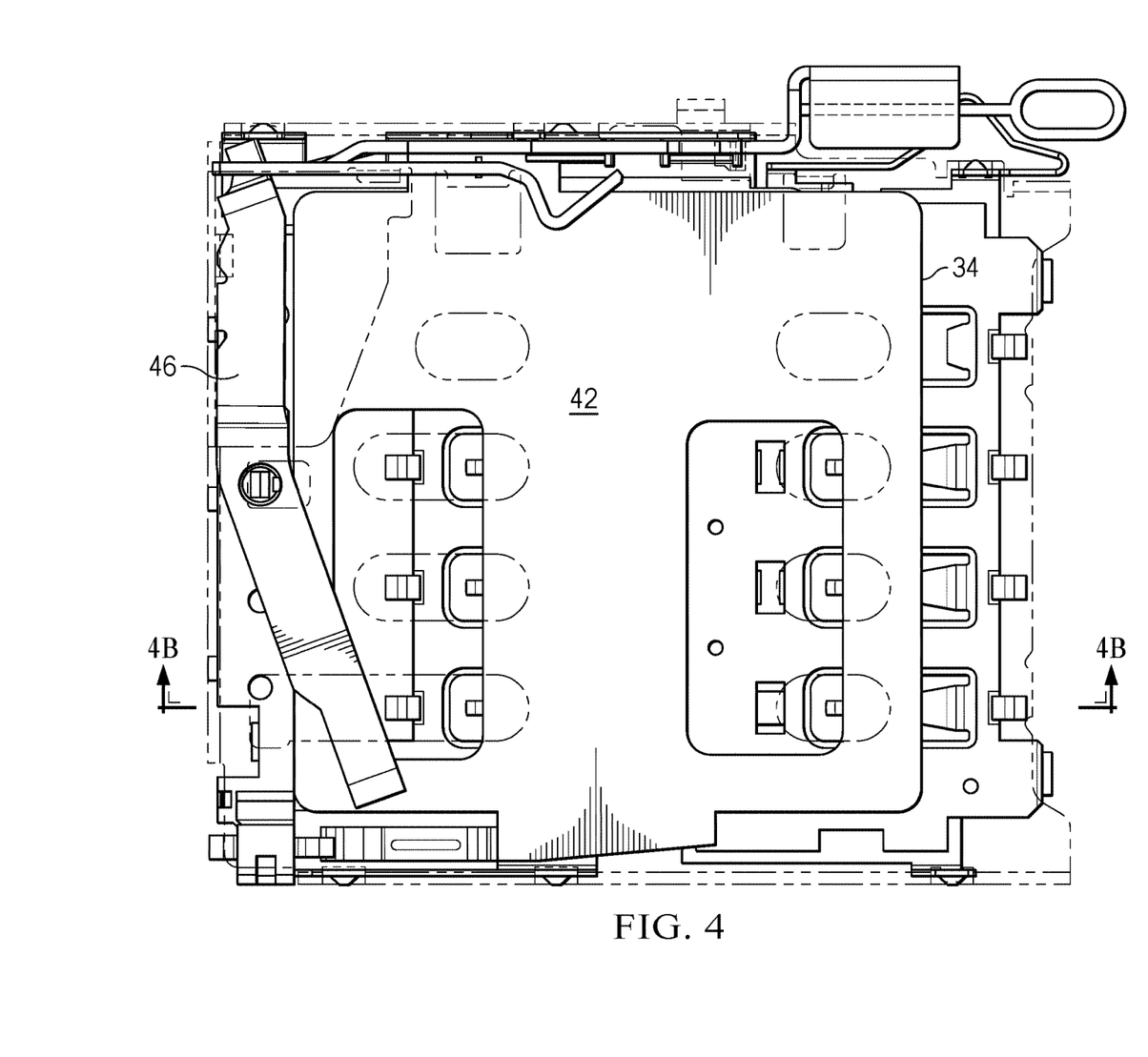
FIGS. 4, 4A and 4B depict sectional views of the planar card socket fully inserted and partially ejected to illustrate movement of the contact cover during activation of an ejection member.
Figure 4A:
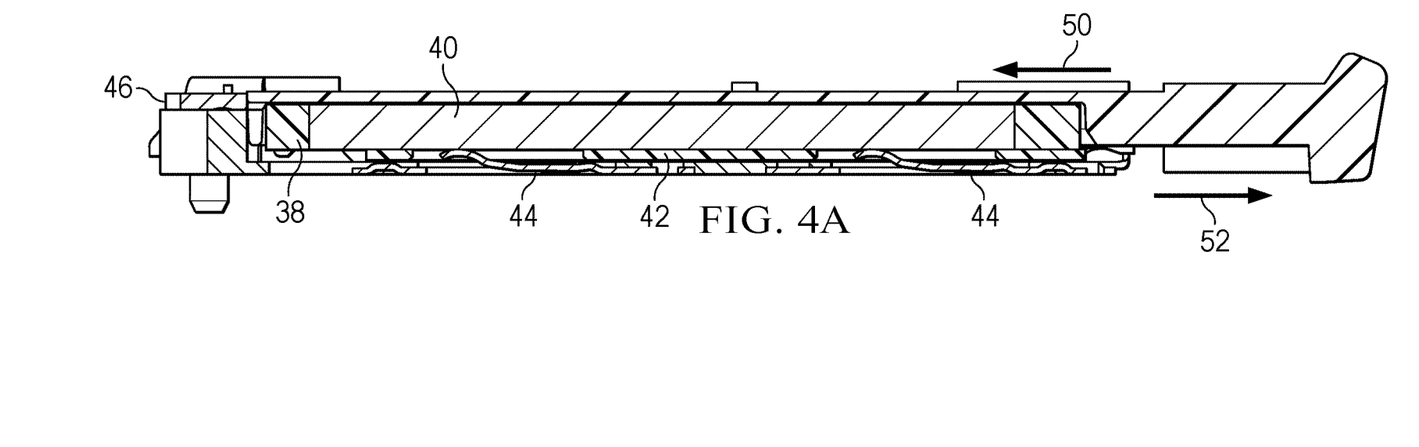
Figure 4B:
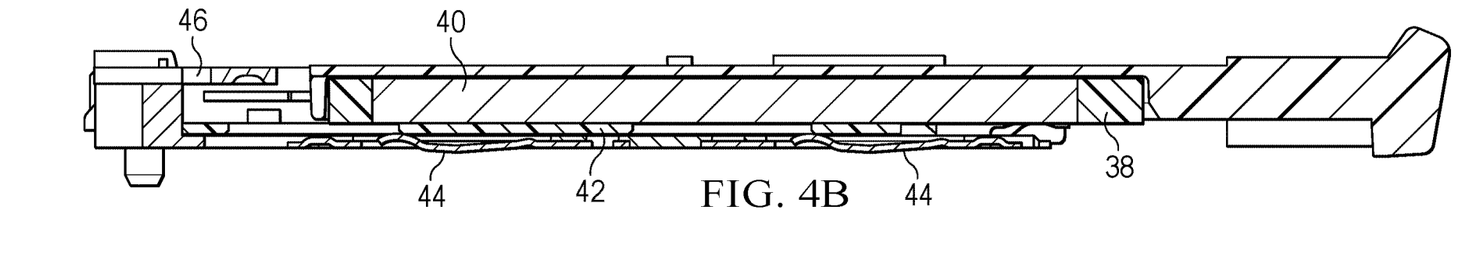

Referring now to FIGS. 4, 4A and 4B, sectional views depict the planar card socket fully inserted and partially ejected to illustrate movement of the contact cover during activation of an ejection member. FIG. 4 depicts an upper view of the planar card socket having eject arm 46 in the eject position with contact cover 42 in a rearward position and a sectional line depicting the location of the sectional views of FIGS. 4A and 4B. FIG. 4A depicts a planar card 40 in an adapter 38 having a spring contact 44 pressing up against a contact pad and with the eject arm 46 in a rearward position. When the eject member is pressed rearward, the nano SIM card will eject as indicated by arrow 52 to the front side of the planar card socket and contact cover 42 will move towards the rear of the socket as indicated by arrow 50. FIG. 4B depicts the planar card socket after actuation of the eject member pushes eject arm 46 forward to slide tray 36, adapter 38 and planar card 40 forward in the socket for removal. The rearward movement of contact cover 42 brings that planar surface of contact cover 42 over spring contacts 44 to press spring contacts 44 downward and out of the way of the sliding adapter 38. As is described above, when adapter 38 is in the planar card socket without a planar card, as is shown by FIG. 4B, contact cover 42 works against spring contacts 44 to prevent engagement with the end of adapter 38 as the adapter ejects. This allows adapter 38 to be stored in the planar card socket when not in use.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to execute instructions that process information;
   a memory disposed in the housing and interfaced with the processor to store the instructions and information;
   a wireless network interface controller interfaced with the processor and operable to communicate by wireless signals with networks; and
   a planar card socket having a slot exposed at the housing to accept a planar card and having plural spring contacts configured to align with contact pads of the planar card, the planar card socket including an eject member coupled to an eject arm and to a contact cover, the contact cover having an opening, the plural spring contacts extending through the opening, the eject member pressing into the socket to activate the eject arm, the eject arm activating to push the planar card in the planar card socket out the slot, the eject member pressing the contact cover into the socket to press down the spring contacts.

2. The information handling system of claim 1 wherein the planar card comprises an integrated circuit having identification information applied to transmit wireless signals with the wireless network interface controller.

3. The information handling system of claim 2 further comprising a planar card configured to fit in the slot and interface with the planar card socket spring contacts with a micro SIM card footprint.

4. The information handling system of claim 2 further comprising an adapter configured to fit in the slot and onto the planar card socket around the spring contacts, the adapter having an outer perimeter of a micro SIM footprint and an inner opening perimeter of a nano SIM footprint.

5. The information handling system of claim 4 further comprising a planar card configured to fit in the adapter inner perimeter and interface with the planar card socket spring contacts with a nano SIM footprint.

6. The information handling system of claim 5 wherein the planar card socket comprises two rows of three spring contacts.

7. The information handling system of claim 6 wherein the contact cover has a first opening aligned with a first of the two rows of three spring contacts and a second opening aligned with a second of the two rows of three spring contacts.

8. The information handling system of claim 7 wherein the eject arm rotates about centrally located hinge pin.

9. A method for ejecting a planar card from a planar card socket, the method comprising:
   pressing an eject member into the planar card socket;
   translating the pressing to slide a contact cover from a forward position in the planar card socket towards a rearward position in the planar card socket;
   translating the pressing to rotate an eject arm from the rearward position to the forward position, the eject arm aligned to push a planar card out of the planar card socket in the forward position;

extending plural spring contacts through an opening of the contact cover in the forward position; and engaging the spring contacts with the contact cover when the contact cover slides towards the rearward position to compress the spring contacts below the contact cover.

10. The method of claim 9 further comprising:

extending the plural spring contacts as a forward row and a rearward row through a forward opening and a rearward opening of the contact cover; and engaging the rearward row with a member of the contact cover located between the forward opening and rearward opening.

11. The method of claim 10 further comprising:

inserting a nano SIM card in an adapter; and inserting the nano SIM card and adapter into the planar card socket, the adapter outer perimeter engaging with the planar card socket, the adapter inner perimeter engaging with the nano SIM, the nano SIM card having contact pads aligned with the spring contacts.

12. The method of claim 11 further comprising:

inserting the adapter into the planar card socket without the nano SIM card; and pressing down on the spring contacts with the contact cover when ejecting the adapter to prevent the spring contact from engaging the adapter.

13. The method of claim 12 further comprising inserting a micro SIM card in the planar card socket without the adapter.

14. The method of claim 13 further comprising:

compressing the contact pads of the nano SIM card against the spring contacts with a SIM tray that slides into a slot of the planar card socket.

15. A planar card socket comprising:

a tray inserted in a housing and configured to accept a planar card;

plural spring contacts configured to align with contact pads of the planar card;

an eject member;

an eject arm coupled to the eject member, the eject member pressing into the housing to activate the eject arm, the eject arm activating to push the planar card and tray out of the housing; and a contact cover having an opening aligned with the spring contacts, the spring contacts extending through the opening when the contact cover is in a forward position, the eject member pressing the contact cover into the housing to press down the spring contacts when the tray slides out of the housing and the contact cover slides towards a rearward position.

16. The planar card socket of claim 15 further comprising an adapter configured to fit in the housing and onto the tray around the spring contacts, the adapter having an outer perimeter of a micro SIM card footprint and an inner opening perimeter of a nano SIM card footprint.

17. The planar card socket of claim 16 further comprising a nano SIM card configured to fit in the adapter and interface with the spring contacts with a nano SIM card footprint.

* * * * *